United States Patent
Jaroch

(10) Patent No.: US 11,150,871 B2
(45) Date of Patent: Oct. 19, 2021

(54) INFORMATION DENSITY OF DOCUMENTS

(71) Applicant: Colossio, Inc., Chicago, IL (US)

(72) Inventor: Joseph A. Jaroch, Chicago, IL (US)

(73) Assignee: Colossio, Inc., Chicago, IL (US)

( * ) Notice: Subject to any disclaimer, the term of this patent is extended or adjusted under 35 U.S.C. 154(b) by 286 days.

(21) Appl. No.: 15/680,788

(22) Filed: Aug. 18, 2017

(65) Prior Publication Data
US 2019/0056913 A1 Feb. 21, 2019

(51) Int. Cl.
*G06F 7/08* (2006.01)
*G06F 16/93* (2019.01)
*G06F 16/338* (2019.01)
*G06F 16/31* (2019.01)
*G06F 16/34* (2019.01)
*G06F 40/205* (2020.01)
*H04L 29/08* (2006.01)

(52) U.S. Cl.
CPC .............. *G06F 7/08* (2013.01); *G06F 16/313* (2019.01); *G06F 16/338* (2019.01); *G06F 16/34* (2019.01); *G06F 16/93* (2019.01); *G06F 40/205* (2020.01); *H04L 67/10* (2013.01)

(58) Field of Classification Search
CPC .......... G06F 16/93; G06F 7/08; G06F 16/313; G06F 16/34; G06F 16/338; G06F 40/205; H04L 67/10
See application file for complete search history.

(56) References Cited

U.S. PATENT DOCUMENTS

| | | | | |
|---|---|---|---|---|
| 8,265,925 B2 * | 9/2012 | Aarskog | ............... | G06F 17/271 707/707 |
| 8,346,791 B1 * | 1/2013 | Shukla | ................ | G06F 16/3325 707/759 |
| 2002/0077832 A1 * | 6/2002 | Leonid | ................ | G06F 17/2235 704/276 |
| 2006/0059442 A1 * | 3/2006 | Bornstein | ............. | G06F 17/211 707/E17.094 |
| 2006/0156222 A1 * | 7/2006 | Chi | ....................... | G06F 17/241 707/E17.058 |
| 2006/0288284 A1 * | 12/2006 | Peters | ..................... | G06F 40/18 715/700 |
| 2008/0077611 A1 * | 3/2008 | Yamasaki | ............ | G11B 27/031 707/999.102 |
| 2009/0037384 A1 * | 2/2009 | Ono | .................... | G06F 16/5854 707/999.003 |

(Continued)

*Primary Examiner* — Kannan Shanmugasundaram
(74) *Attorney, Agent, or Firm* — Barnes & Thornburg LLP

(57) ABSTRACT

A method that includes receiving a document, the document including multiple data units arranged in a sequence, is provided. The method includes separating a fragment from the sequence by identifying a delimiter that includes one of a start or an end of the fragment, separating a data unit from the fragment by identifying a second delimiter, determining a fragment rank based on a frequency score of the data unit within the fragment, and placing the fragment in a sorted list based on the fragment rank including multiple fragments. The method includes forming a modified document including at least a top fragment from the sorted list, the top fragment having a top fragment rank greater than a user selected rank and providing the modified document to the user. A system and a non-transitory, computer readable medium storing instructions to perform the method are also provided.

19 Claims, 7 Drawing Sheets

(56) References Cited

U.S. PATENT DOCUMENTS

| | | | |
|---|---|---|---|
| 2011/0238420 A1* | 9/2011 | Hirabayashi | G10L 13/033 704/260 |
| 2012/0041977 A1* | 2/2012 | Kimura | G06F 16/90344 707/772 |
| 2015/0234703 A1* | 8/2015 | Udayashankar | G06F 11/1004 707/646 |

* cited by examiner

ND DOCUMENTS

TECHNICAL FIELD

The present disclosure generally relates to information density inspection of documents. More specifically, the present disclosure relates to information density inspection of arbitrary data sets.

BACKGROUND

Current approaches to analyzing data focus predominately on written words, rather than working generically across all types of data (images, computer code, DNA sequences, and database entries represent a few examples). It is desired to utilize different approaches and concepts to enable a user to identify relevant information in the context of a body of data and the relative importance of each fragment of data. In some embodiments, systems and methods as disclosed herein avoid the use of a full grammar parsing or an understanding of the underlying structure of the data, which typically involves complex and lengthy algorithms. Furthermore, embodiments as disclosed herein remove the problem typically encountered by over-interpretation of systems that include an "understanding" of the "meaning" of the data units within the fragments selected by the parsing engine.

The description provided in the background section should not be assumed to be prior art merely because it is mentioned in or associated with the background section. The background section may include information that describes one or more aspects of the subject technology.

SUMMARY

According to certain aspects of the present disclosure, a computer-implemented method is described. The computer-implemented method includes receiving a document, the document including multiple data units arranged in a sequence, and separating a fragment from the sequence by identifying a token delimiter, wherein the token delimiter includes one of a start portion or an end portion of the fragment. The computer-implemented method also includes separating a first data unit from the fragment by identifying a second token delimiter, determining a fragment rank based on a frequency score of the first data unit within the fragment, placing the fragment in a sorted list based on the fragment rank, the sorted list including multiple fragments of the document. The computer-implemented method includes forming a modified document including at least a top fragment from the sorted list, the top fragment having a top fragment rank greater than a user selected rank and providing the modified document to the user.

According to one embodiment, a system is described that includes one or more processors and a memory coupled to the one or more processors, the memory including instructions that, when executed by the one or more processors, cause the one or more processors to receive a document, the document including multiple data units arranged in a sequence, to separate a fragment from the sequence by identifying a token delimiter, wherein the token delimiter comprises one of a start portion or an end portion of the fragment, and to separate a first data unit from the fragment by identifying a second token delimiter. The one or more processors also execute instructions to determine a fragment rank based on a frequency score for the first data unit within the fragment, to separate a first data unit from the fragment by identifying a second token delimiter, to place the fragment in a sorted list based on the fragment rank, the sorted list comprising multiple fragments of the document, to form a modified document including at least a top fragment from the sorted list, the top fragment having a top fragment rank greater than a user selected rank, and to provide the modified document to the user.

According to one embodiment, a non-transitory, machine readable medium is described that includes instructions, which when executed by one or more processors, causes a computer to perform a method. The method includes receiving a document, the document including multiple data units arranged in a sequence, and separating a fragment from the sequence by identifying a token delimiter, wherein the token delimiter includes one of a start portion or an end portion of the fragment. The method also includes separating a first data unit from the fragment by identifying a second token delimiter, determining a fragment rank based on a frequency score of the first data unit within the fragment, placing the fragment in a sorted list based on the fragment rank, the sorted list including multiple fragments of the document. The method includes forming a modified document including at least a top fragment from the sorted list, the top fragment having a top fragment rank greater than a user selected rank and providing the modified document to the user.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description, serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

Figure 1:
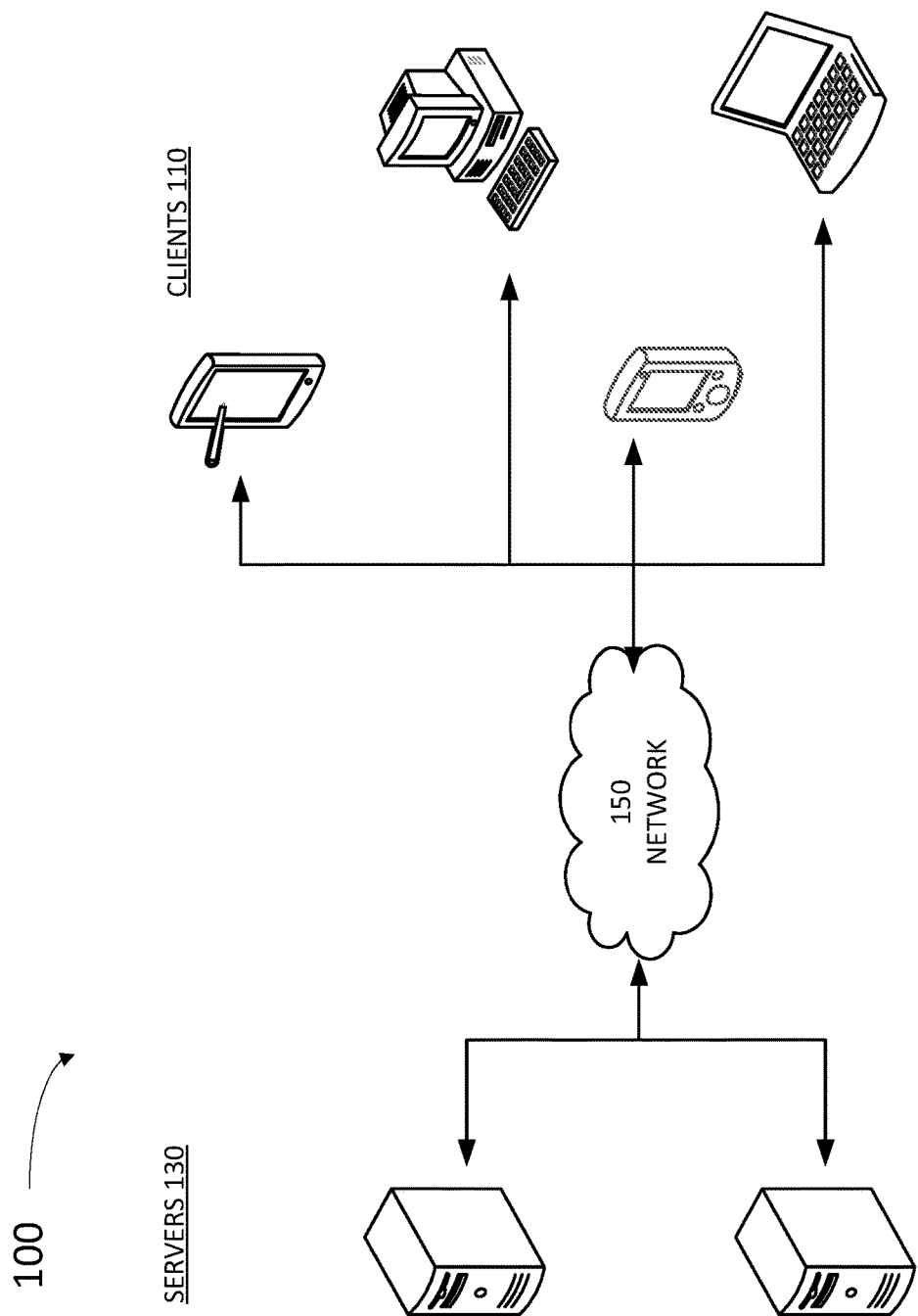
FIG. 1 illustrates an example architecture suitable for determining an information density in a document, according to some embodiments.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

General Overview

As used herein, the term "content item" may be used, for example, in reference to a digital file that is composed of one or more media elements of different types (text, image, video, audio, etc.). A content item can be a single picture, a single video file, a text-rich document, etc. The term "image identifier" as used herein may refer to a form of metadata such as a tag, a label, or a caption associated with an image for identifying the image.

The quantity of data produced in today's world presents deep challenges to being able to navigate and understand information. It is necessary to correlate information from disparate sources, which, in many instances, requires manual labor to parse and annotate, encountering human limitations to the scale of data consumption. Additionally, an increasingly global world produces content in a wide variety of languages. Current approaches to analyzing data require intimate knowledge about each language to be able to parse and establish context about text. This introduces language barrier challenges and difficulty as languages naturally evolve over time. For humans reading text, it is often difficult to prioritize and filter out superfluous information, slowing reading speed and potentially causing frustration when the intended answer was not present within the text.

Embodiments as disclosed herein enable a user to identify relevant information in the context of a body of data and the relative importance of each fragment of data. In some embodiments, systems and methods as disclosed herein avoid the use of a full grammar parsing or an understanding of the underlying structure of the data, which typically involves complex and lengthy algorithms. Furthermore, embodiments as disclosed herein remove the problem typically encountered by over-interpretation of systems that include an "understanding" of the "meaning" of the data units within the fragments selected by the parsing engine.

The disclosed system addresses the problem of identifying relevant information in a document, which is a problem specifically arising in the realm of computer technology, by providing a solution also rooted in computer technology, namely, by parsing the data content in the document into fragments containing units and, based on a frequency of the units within a fragment relative to a reference sample set, determining the presence of new information in the fragment.

The proposed solution further provides improvements to the functioning of the computer itself because it saves computer usage and computational time (e.g., substantially shortening the search time for a query within a text-rich document, a long surveillance video, and the like).

Embodiments as disclosed herein may further automatically highlight key phrases and sentences within a body of text to allow for faster "speed" reading. Further, some embodiments may include workflow applications to expedite reading and consumption of information for users (e.g., researchers and scholars, lawyers and the like). Accordingly, users can parse through papers and lengthy or verbose documents quickly, avoiding redundant or unnecessary context, reducing the overhead and time required to learn about a particular subject.

In some embodiments, a parsing engine as disclosed herein may include a high frequency trading algorithm for a more accurate weighing of a data point associated with a stock market value of a company. Accordingly, the parsing engine may identify trends in a press release to determine key information pertaining to the company. In yet other embodiments, a parsing engine as disclosed herein may select a representative sampling of the most important information within a large document, thereby allowing executives and publishing houses to prioritize their efforts to read and ascertain the value of the document.

Although many examples provided herein describe a user's search inputs being identifiable, or download history for images being stored, each user may grant explicit permission for such user information to be shared or stored. The explicit permission may be granted using privacy controls integrated into the disclosed system. Each user may be provided notice that such user information will be shared with explicit consent, and each user may at any time end having the information shared, and may delete any stored user information. The stored user information may be encrypted to protect user security.

Example System Architecture

FIG. 1 illustrates an example architecture 100 for determining information density of documents, according to some embodiments. Architecture 100 includes servers 130 and clients 110 connected over a network 150. One of the many servers 130 is configured to host a memory including instructions which, when executed by a processor, cause the server 130 to perform at least some of the steps in methods as disclosed herein. In some embodiments, the processor is configured to receive multimedia files including images, video, music, and the like from a user through client device 110. Further, in some embodiments, the processor in server 130 is configured to receive a document and to determine an information density in the document. Moreover, in some embodiments, the processor is configured to provide to the user, through a client 110, a modified document to emphasize areas of high information density in the original document. For purposes of load balancing, multiple servers 130 can host memories including instructions to one or more processors and multiple servers 130 can host the collection of images.

Servers 130 may include any device having an appropriate processor, memory, and communications capability for hosting a parsing engine that may divide a document into fragments and units, perform a statistical analysis of the units, determine an information density, and store the statistical analysis and the information density in a database. The parsing engine is accessible by various clients 110 over the network 150. Clients 110 can be, for example, desktop computers, mobile computers, tablet computers (e.g., including e-book readers), mobile devices (e.g., a smartphone or PDA), or any other devices having appropriate processor, memory, and communications capabilities for accessing the parsing engine on one of servers 130. Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

Example System

Figure 2:
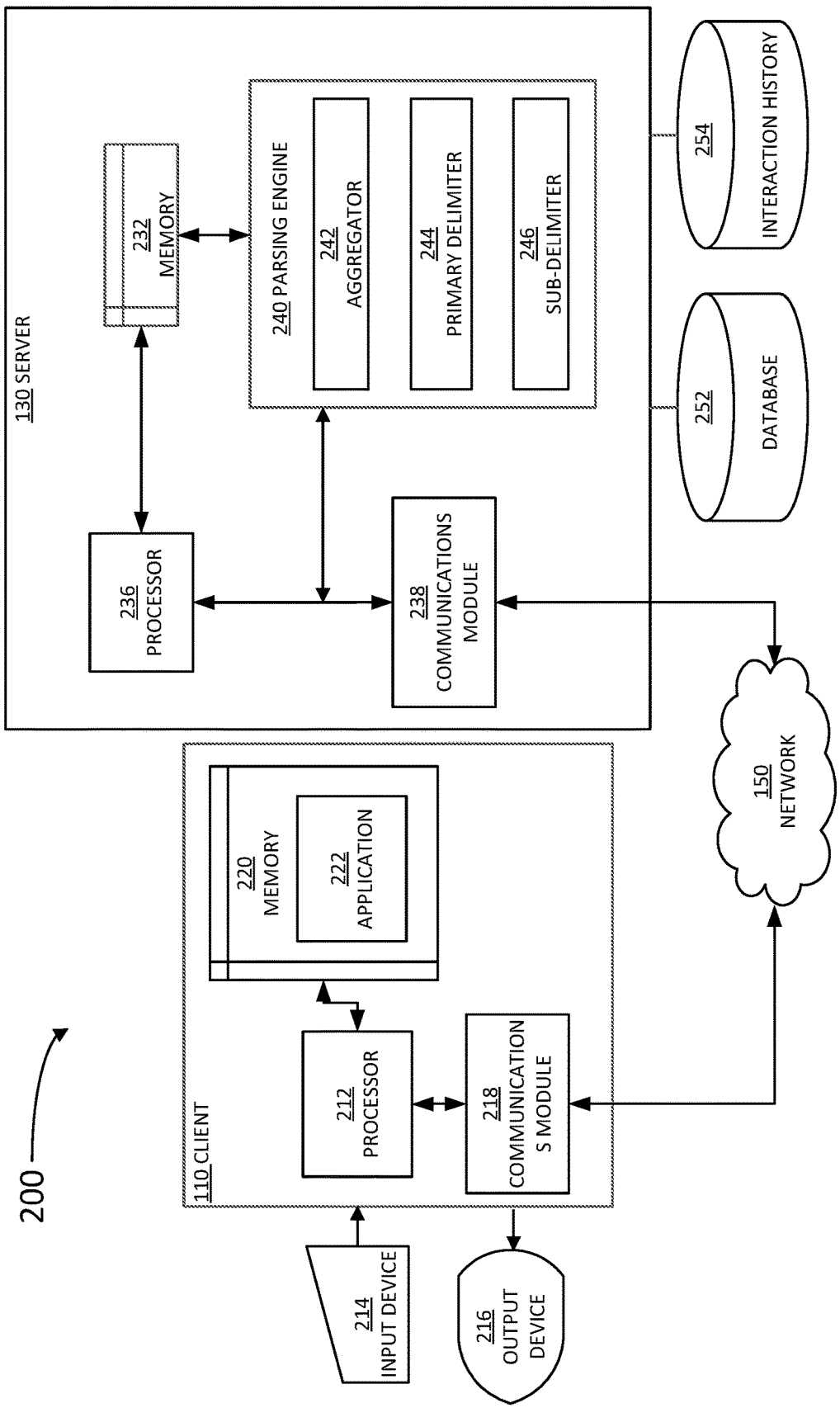
FIG. 2 is a block diagram illustrating an example server and client from the architecture of FIG. 1 according to certain aspects of the disclosure.

FIG. 2 is a block diagram 200 illustrating an example server 130 and client 110 in the architecture 100 of FIG. 1 according to certain aspects of the disclosure. Client 110 and server 130 are communicatively coupled over network 150 via respective communications modules 218 and 238. Communications modules 218 and 238 are configured to interface with network 150 to send and receive information, such as data, requests, responses, and commands to other devices on the network. Communications modules 218 and 238 can be, for example, modems or Ethernet cards.

Server 130 includes a memory 232, a processor 236, and a communications module 238. Server 130 also includes a parsing engine 240 having an aggregator 242, a primary delimiter 244, and a sub-delimiter 246. Processor 236 is configured to interact with, and execute instructions from, parsing engine 240. Parsing engine 240 may execute commands stored in memory 232, and retrieve/store data from and to memory 232. Server 130 also includes, or may be coupled with, a database 252 and an interaction history recipient 254. In one or more implementations, database 252 represents a database that contains data units and associated information regarding the data units, such as statistical analysis and location information for the data unit within a document.

In some embodiments, database 252 and interaction history recipient 254 may be external to server 130, for example, they can be hosted in a memory of a different server but accessible by server 130. For example, in some embodiments database 252 and interaction history recipient 254 may be remotely accessible to server 130 through network 150. In some embodiments, database 252 and interaction history recipient 254 may be internal to server 130. Interaction history recipient 254 may include prior parsing results that parsing engine 240 may use for further applications to shorten the processing. For example, when parsing engine 240 is used for parsing text rich documents, access to results obtained from prior documents may be relevant for parsing engine 240 to determine a frequency score for certain words in a sentence (e.g., in an English document). In some embodiments, when parsing engine 240 is used to parse a genome to determine certain disease patterns and the like, parsing engine 240 may use prior genomes stored in interaction history recipient 254 so as to strengthen the scoring capability for the frequency of newly introduced genomes.

The user may access parsing engine 240 through, among other means, an application 222 or a web browser installed in client 110. Execution of application 222 may be controlled by a processor 212 in client 110. In some embodiments, a user provides a target file (e.g., a text rich document), via input device 214 in client device 110, through network 150. For example, the user may use input device 214 to enter a captured photo, a video clip, an audio clip, an article, a book, or a genome sequence. A user of client 110 may use input device 214 to submit a document (e.g., target A) to determine information density via a user interface of application 222. For example, application 222 may open a portal for the user in output device 216 (e.g., a display), including one or more controls to allow the user to select a preferred modality for parsing target document A. In some aspects, parsing target document A may be initiated automatically upon receiving the document. In response to the user input, processor 212 transmits target document A over network 150, using communications module 218, to communications module 238.

Aggregator 242 receives a target document A and forms a sequence of data units that is processed thereafter by primary delimiter 244. Primary delimiter 244 extracts fragments from the sequence provided by aggregator 242, and the fragments are transferred to sub-delimiter 246, which further parses each of the fragments into data units, and performs statistical analysis on the data units. In some embodiments, the function of sub-delimiter 246 and the function of primary delimiter 244 may be combined or preformed in a sequence, or interleaved with each other.

Figure 3:
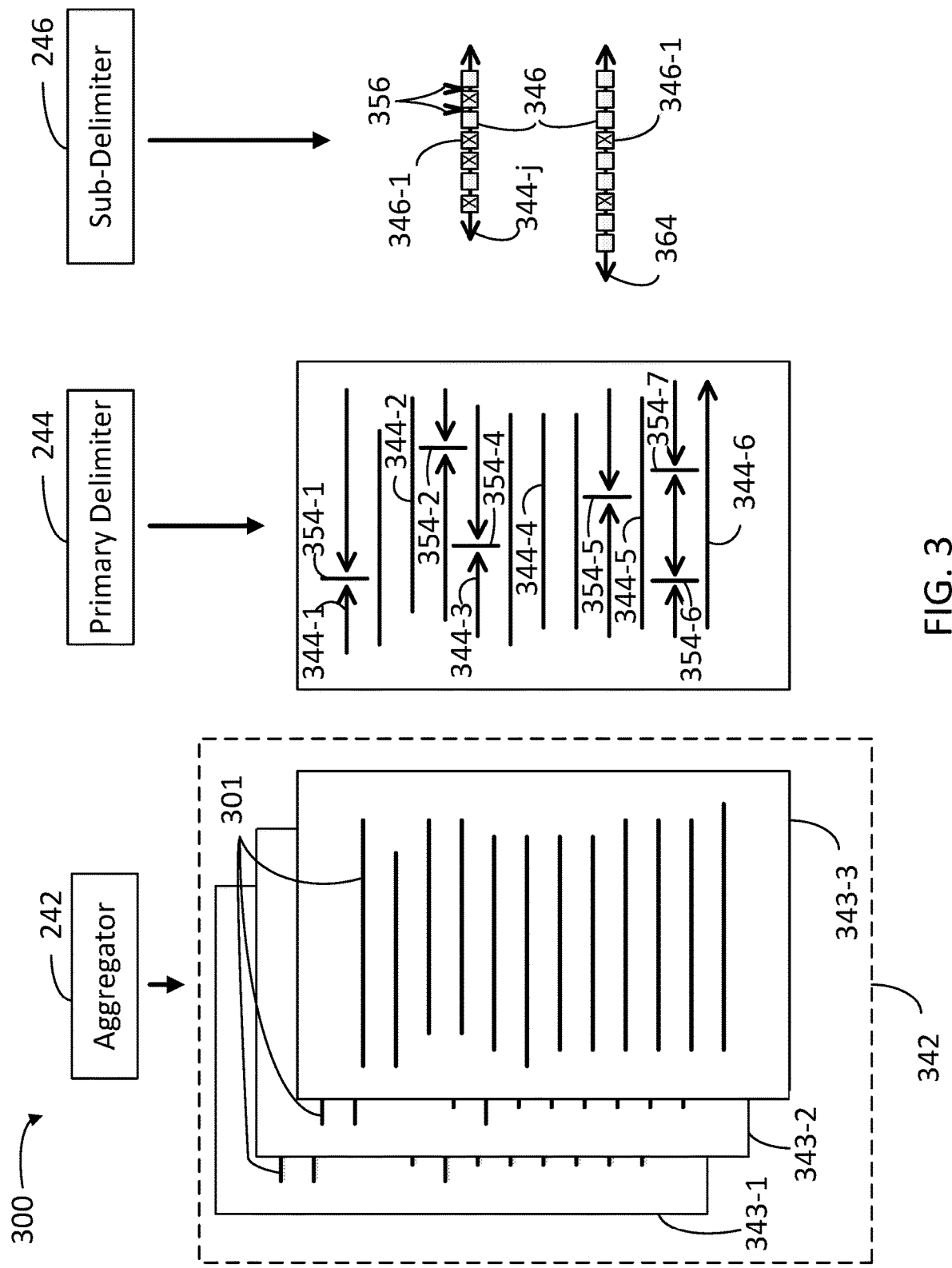
FIG. 3 is a block diagram illustrating steps by a parsing engine to obtain frequency scores for data units in a document, according to some embodiments.

FIG. 3 is a block diagram 300 illustrating steps by a parsing engine (e.g., parsing engine 240) to obtain frequency scores for data units in a document 342, according to some embodiments. In some embodiments, document 342 may include any one of a video file, an image file, a text-rich document, or at least a portion of a genome. Aggregator 242 receives multiple "pages" 345-1, 345-2, 345-3 (hereinafter, collectively referred to as "pages 345") that form document 342. In general, pages 345 may be part of the same document 342, or may be separate documents that the user desires to process through the parsing engine in the same batch. Aggregator 242 forms a sequence 301 of data units from pages 345 in document 342.

Primary delimiter 244 receives sequence 301 and searches for tokens 354-1, 354-2, 354-3, 354-4, 354-5, 354-6, and 354-7 (hereinafter, collectively referred to as "tokens 354") within the sequence. Primary delimiter 244 then separates fragments 344-1, 344-2, 344-3, 344-4, 344-5, and 344-6 (hereinafter, collectively referred to as "fragments 344") from sequence 301. Fragments 344 are delimited at a start portion and at an end portion by a token 354. For example, in embodiments where sequence 301 is a text string, tokens 354 may include a period, and fragments 344 may be sentences.

When document 342 is a video file or an image, and sequence 301 includes an image, primary delimiter 244 may include a find contours algorithm to generate outlines of the picture, which then become fragments 344. When document 342 is an audio file (e.g., a piece of music), the first pass of fragmenting may be to identify frequencies with the greatest differential in amplitude over a given period of time.

Sub-delimiter 246 receives the multiple fragments 344. For each fragment 344-$i$, sub-delimiter 246 identifies data units 346 separated by sub-tokens 356. While only two sub-tokens 356 are shown in FIG. 3 for illustration purposes, it is understood that each of data units 346 is separated at a begin portion and at an end portion, by a sub-token 356, from a neighboring data unit 356. In some embodiments, sub-tokens 356 may be different from tokens 354. For example, and without limitation, when tokens 354 are periods, sub-tokens 356 may include a comma, a colon, or a semicolon, and data units 346 may include words.

In some embodiments, fragment 344-$j$ may include multiple repetitions of data units 346-1 (e.g., the article 'the' in an English sentence). Accordingly, the parsing engine may be configured to calculate the frequency of each data unit 346 within a fragment 344. Moreover, in some embodiments the parsing engine may determine an average fragment 364 having an average fragment size and an average data unit content. For example, the parsing engine may determine an average frequency for data unit 346-1 in several, or all of fragments 344-$i$ that occur prior to fragment 344-$j$ (e.g., $i<j$). In some embodiments, average fragment 364 may be determined using all, or almost all, of fragments 344 in document 342, including those fragments 344-*k* that are posterior to fragment 344-*j* (j<k). To achieve this, the parsing engine may use data stored in a database or an interaction history recipient (e.g., database 252 and interaction history recipient 254).

In some embodiments, the parsing engine uses the frequency of data unit 346-1 as compared to the average frequency of data unit 346-1, to assess a frequency score to data unit 346-1. Further, the parsing engine may assign a frequency score to multiple, or all of data units 346 in fragment 344-*j*. With multiple frequency scores for all, or almost all, of data units 346 in fragment 344-*j*, the parsing engine may determine a fragment rank for fragment 344-*j*. The fragment rank is an indicator of an information density in fragment 344-*j*, and may be used to compare this information density to any other fragment 344 within document 342, ranked in the same manner.

When document 342 is a text-rich document and sequence 301 is a text string, sub-delimiter 246 may be configured to identify stems of words to form data units 346. Accordingly, sub-delimiter 246 may remove word terminations such as: "-ing, -ed, -s," and the like (e.g., in the case of the English language). Also, in some embodiments sub-delimiter 246 is configured to correct obvious spelling mistakes (e.g., via alphabetizing and hashing the word to account for complete jumbling of characters) prior to forming data units 346. This preparation and hashing allows data units 346 to be treated in a similar way as the human brain reads or perceives information (e.g., when "fast" reading a text, allowing for letter inversion, reorganization, and word shortening). One advantage of embodiments as disclosed herein is that the parsing engine is not constrained by a specific language of the text string, as no semantic interpretation of data units 346 within fragment 344 is involved.

In some embodiments, document 342 may be a text-rich document but sequence 301 may correspond to software code so that data units 346 are not necessarily words, but combinations of relevant characters. In such embodiments, a user may select sub-tokens 356 to be "carriage return," or "end of line" characters, rather than spaces. Accordingly, when sequence 301 includes a software code, data units 346 may include commands identifiable in a selected compiler code.

In some embodiments, document 342 is a genome, or at least a portion of a genome, and sequence 301 includes a string of deoxyribonucleic (DNA) bases: adenine (A), thymine (T), cytosine (C), guanine (G). Accordingly, fragments 344 may be genes and data units 346 may be either one of the four bases A, T, C, and G.

Figure 4:
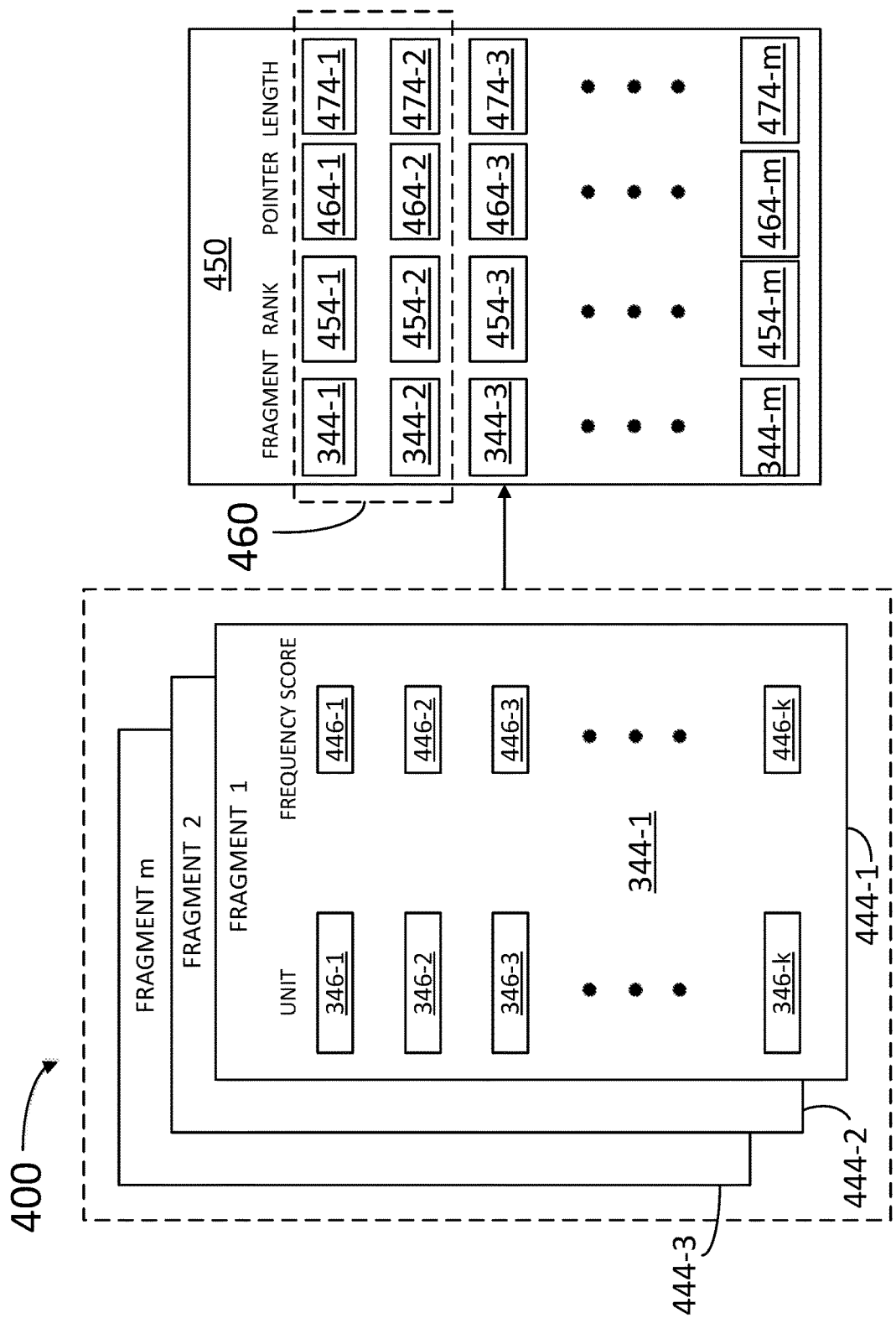
FIG. 4 is a block diagram illustrating steps by a parsing engine to score fragments of a document based on an information density, according to some embodiments.

FIG. 4 is a block diagram 400 illustrating steps by a parsing engine (e.g., parsing engine 240) to score fragments of a document based on an information density, according to some embodiments. In some embodiments, the parsing engine forms tables 444-1, 444-2, and 444-3 (hereinafter, collectively referred to as "tables 444"), each corresponding to a fragment 344 (e.g., fragment 1, fragment 2, and fragment m, where 'm' may be the total number of fragments in document 342). Table 444-1 includes a listing of data units 346-1 through 346-*k* within fragment 344-1 (where 'k' may be the total number of data units 346 in fragment 344-1), and an associated frequency score 446-1 through 446-*k* (hereinafter, collectively referred to as "frequency scores 446") for each data unit 346.

In some embodiments, the parsing engine collects information from tables 444 and forms a sorted list 450. Sorted list 450 includes fragments 344-1 through 344-*m*, associated with fragment ranks 454-1 through 454-*m* (hereinafter, collectively referred to as "fragment ranks 454"), respectively. For example, the parsing engine may determine fragment rank 454-1 for fragment 344-1 based on frequency scores 446 in table 444-1.

In some embodiments, fragment rank 454 is obtained by a ratio of number of data units 346 having a low frequency score 446 to a number of data units 346 having a high frequency score 446 in the corresponding table 444.

Sorted list 450 also includes pointers 464-1 through 464-*m* (hereinafter, collectively referred to as "pointers 464"), and lengths 474-1 through 474-*m* (hereinafter, collectively referred to as "lengths 474"), associated with fragments 344-1 through 344-*m*, respectively. Pointers 464 indicate, for each associated fragment, a fragment location within sequence 301 (e.g., in document 342). Similarly, lengths 474 indicate, for each associated fragment, the number of data units (e.g., the "length") in the fragment.

In some embodiments when document 342 is a genome, or at least a portion of a genome, and sequence 301 includes a string of deoxyribonucleic (DNA) bases: adenine (A), thymine (T), cytosine (C), guanine (G), frequency scores 446 may indicate areas of the genome where relevant mutations occur. Further, the specific genes 344 involved in the mutations may be located within the genome or the portion of the genome by pointers 464.

A user then may select a relevant set 460 including one or more fragments from sorted list 450 (e.g., fragments 344-1 and 344-2) to form a modified document. In some embodiments, the user also determines the number of fragments 344 to include in relevant set 460. The modified document may include document 342 with fragments 344-1 and 344-2 highlighted appropriately. The highlighting of fragments 344-1 and 344-2 is possible because sorted list 450 includes pointers 464 and lengths 474 for each fragment 344 listed therein. For example, when document 342 is a book, a modified document may include the same book with highlighted sections and paragraphs, for ease of reading by the user.

Figure 5:
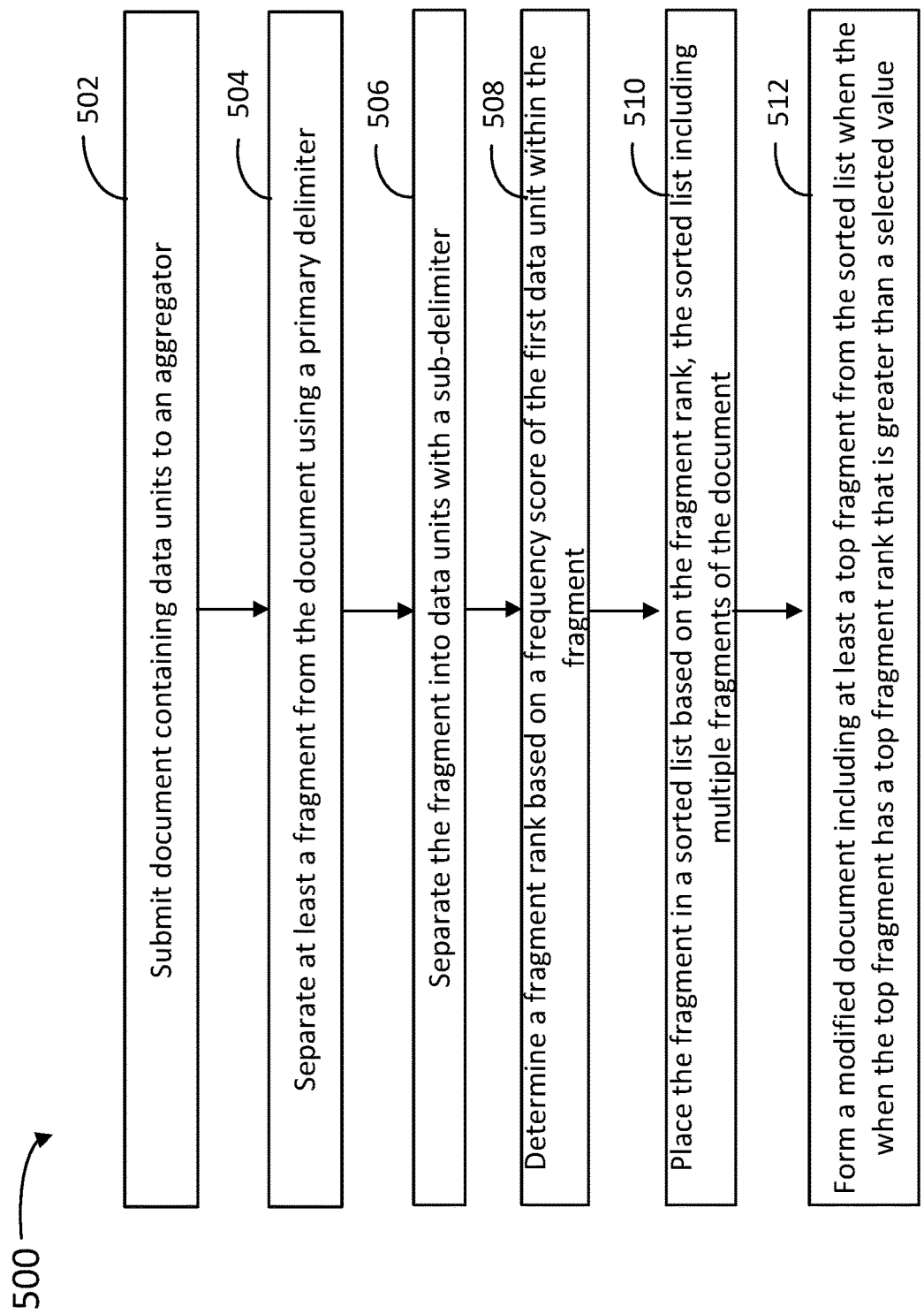
FIG. 5 is a flow chart illustrating steps in a method for determining an information density in a document, according to some embodiments.

FIG. 5 is a flow chart illustrating steps in a method 500 for determining an information density in a document, according to some embodiments. Method 500 may be performed at least partially by any one of network servers hosting a collection of images, videos, and multimedia files (e.g., images, audio and video clips), while communicating with any one of a plurality of client devices (e.g., any one of servers 130 and any one of clients 110). The client devices may be handled by a user, wherein the user may be registered to a private account with the server, or may be a visitor to the server website or logged in a server application installed on the client device. At least some of the steps in method 600 may be performed by a computer having a processor executing commands stored in a memory of the computer (e.g., processors 212 and 236, memories 220 and 232). Further, steps as disclosed in method 500 may include retrieving, editing, and/or storing files in a database that is part of, or is communicably coupled to, the computer, using inter-alfa, a parsing engine including an aggregator, a primary delimiter, and a sub-delimiter (e.g., parsing engine 240, aggregator 242, primary delimiter 244, and sub-delimiter 246, respectively). The database may include an interaction history recipient (e.g., interaction history recipient 254). Methods consistent with the present disclosure may include at least some, but not all of, the steps illustrated in method 500 performed in a different sequence. Furthermore, methods consistent with the present disclosure may include at least two or more steps as in method 500 performed overlapping in time, or almost simultaneously.

Step 502 includes submitting the document containing data unites to an aggregator. In some embodiments, step 502 includes receiving a document, the document comprising multiple data units arranged in a sequence. In some embodiments, step 502 includes receiving one of a video file, an image file, a text-rich document, or at least a portion of a genome.

Step 504 includes separating at least a fragment from the document using a primary delimiter. In some embodiments, step 504 includes separating a fragment from the sequence by identifying a token delimiter, wherein the token delimiter comprises one of a start portion or an end portion of the fragment.

Step 506 includes separating the fragment into data units with a sub-delimiter. In some embodiments, step 506 includes separating a first data unit from the fragment by identifying a second token delimiter. In some embodiments, when the document is a text-rich document and the sequence includes a text, step 506 includes identifying a period in the text and separating the first data unit from the fragment comprises identifying a space in the text. In some embodiments, when the document is a video file or an image, step 506 includes finding a contour in a picture and selecting the fragment from an outline formed by the contour when the document comprises an image. In some embodiments, when the document comprises an audio document, step 506 includes identifying an amplitude differential greater than a pre-selected threshold in at least one frequency component in the document over a period of time and selecting the fragment to comprise at least a data unit within the period of time.

Step 508 includes determining a fragment rank based on a frequency score of the first data unit within the fragment. In some embodiments, when the document is a text-rich document, the sequence includes a text and the first data units are words, step 508 may include stemming the words and normalizing the word prior to finding the frequency scores for the word. In some embodiments, step 508 includes determining the frequency score of the first data unit based on a frequency of the first data unit and a frequency of a second data unit within the fragment. In some embodiments, when the document is a text-rich document, the sequence is a text, the fragment is a sentence, and the first data unit is a word, step 508 includes identifying a scarcity score of the word within the text-rich document and identifying a location in the text where a new information is introduced based on a change in the scarcity score at the location in the text. In such embodiments, step 508 may further include determining a scarcity score for each of the multiple words in the sentence. In some embodiments, step 508 includes determining a ratio of a number of data units having a low frequency score to a number of data units having a high frequency score.

Step 510 includes placing the fragment in a sorted list based on the fragment rank, the sorted list comprising multiple fragments of the document. In some embodiments, step 510 includes associating the fragment with a pointer identifying a location of the fragment in the sequence and with a length identifying a number of data units in the fragment.

Step 512 includes forming a modified document including at least a top fragment from the sorted list, the top fragment having a top fragment rank greater than a user selected rank. In some embodiments, step 512 also includes providing the modified document to the user. In some embodiments, step 512 includes associating the fragment with a pointer identifying a location of the fragment in the sequence and with a length identifying a number of data units in the fragment. In some embodiments, step 512 includes receiving, from the user, a number of fragments to select from the sorted list.

Figure 6:
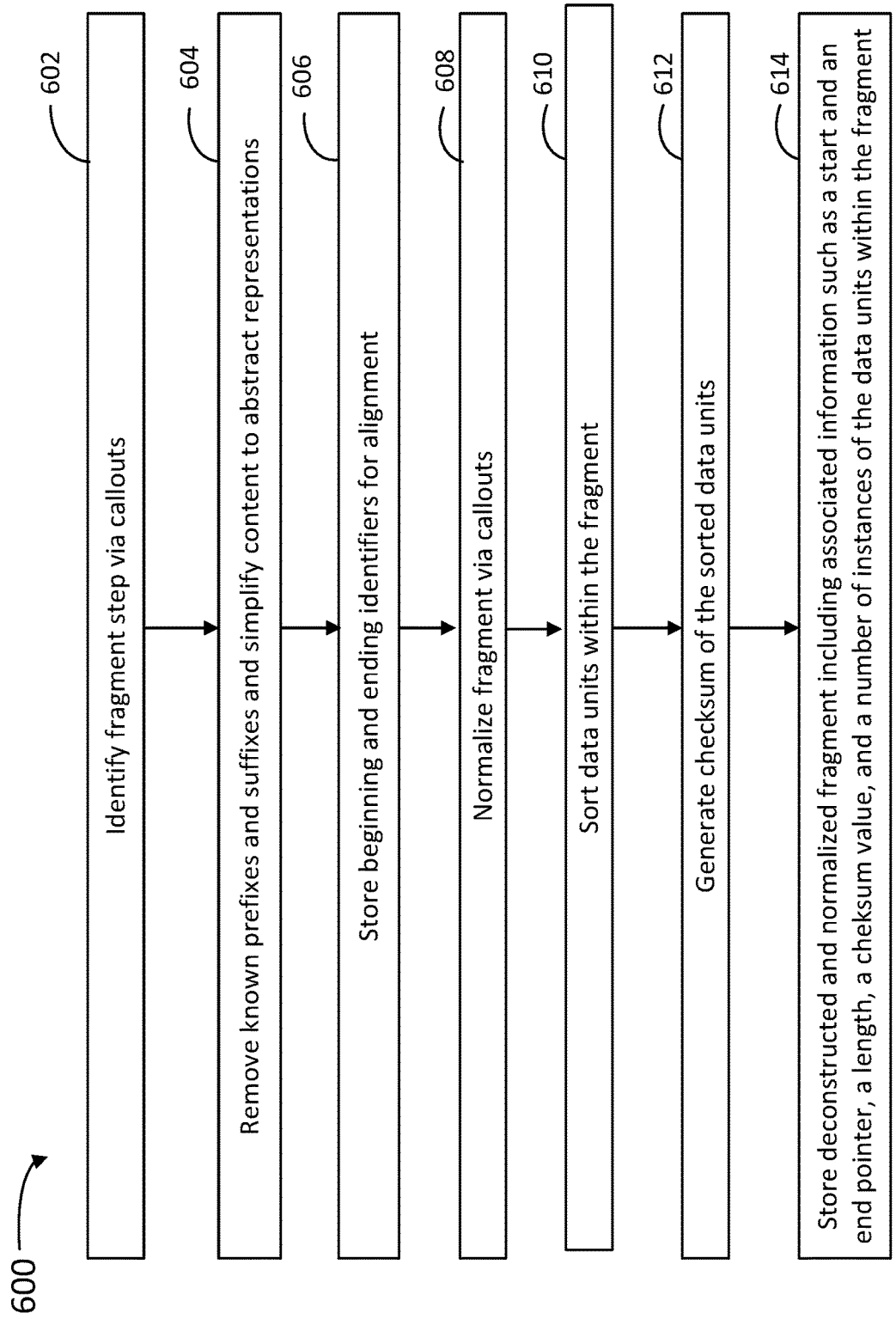
FIG. 6 is a flow chart illustrating steps in a method for determining an information density in a document, according to some embodiments.

FIG. 6 is a flow chart illustrating steps in a method 600 for determining an information density in a document, according to some embodiments. Method 600 may be performed at least partially by any one of client devices (e.g., any one of servers 130 and any one of clients 110) communicating with any one of network servers hosting a collection of images, videos, and multimedia files (e.g., images, audio and video clips). The client devices may be handled by a user, wherein the user may be registered to a private account with the server, or may be a visitor to the server website or logged in a server application installed in the client device. At least some of the steps in method 600 may be performed by a computer having a processor executing commands stored in a memory of the computer (e.g., processors 212 and 236, memories 220 and 232). Further, steps as disclosed in method 600 may include retrieving, editing, and/or storing files in a database that is part of, or is communicably coupled to, the computer, using inter-alfa, a parsing engine including an aggregator, a primary delimiter, and a sub-delimiter (e.g., parsing engine 240, aggregator 242, primary delimiter 244, and sub-delimiter 246, respectively). The database may include an interaction history recipient (e.g., interaction history recipient 254). Methods consistent with the present disclosure may include at least some, but not all, of the steps illustrated in method 600 performed in a different sequence. Furthermore, methods consistent with the present disclosure may include at least two or more steps as in method 600 performed overlapping in time or almost simultaneously.

Step 602 includes identifying fragment steps via callouts. In some embodiments, step 602 may include placing callouts over a token delimiter in a sequence formed from a document targeted for parsing (e.g., token delimiters 354, sequence 301, and document 342, compared to FIG. 3).

Step 604 includes removing known prefixes and suffixes and simplifying content to abstract representations. In some embodiments, step 604 includes removing a prefix and/or a suffix of a word to obtain the stem of the word as a data unit.

Step 606 includes storing beginning and ending identifiers for the fragment for later alignment (e.g., when forming a modified document with highlighted fragments).

Step 608 includes normalizing fragments via callouts.

Step 610 includes sorting data units within the fragment. In some embodiments, step 610 may include determining a frequency score for each of the data units in the fragment and forming a table with the data units sorted according to their frequency score (e.g., tables 444, cf. FIG. 4).

Step 612 includes generating a checksum of the sorted data units of the fragment. In some embodiments, step 612 may include adding a higher weight to data units having a higher frequency score. In some embodiments, step 612 may include adding a higher weight to data units having a lower frequency score. In some embodiments, step 612 may include determining a fragment rank based on the checksum.

Step 614 includes storing deconstructed and normalized fragments including associated information such as a start and an end pointer, a length, a checksum value, and a number of instances of the data units within the fragment. In some embodiments, step 614 may include forming a sorted list with the deconstructed and normalized fragments (e.g., sorted list 450, cf. FIG. 4) in a database or in an interaction history recipient (e.g., database 252, and interaction history recipient 254, cf. FIG. 2).

Hardware Overview

Figure 7:
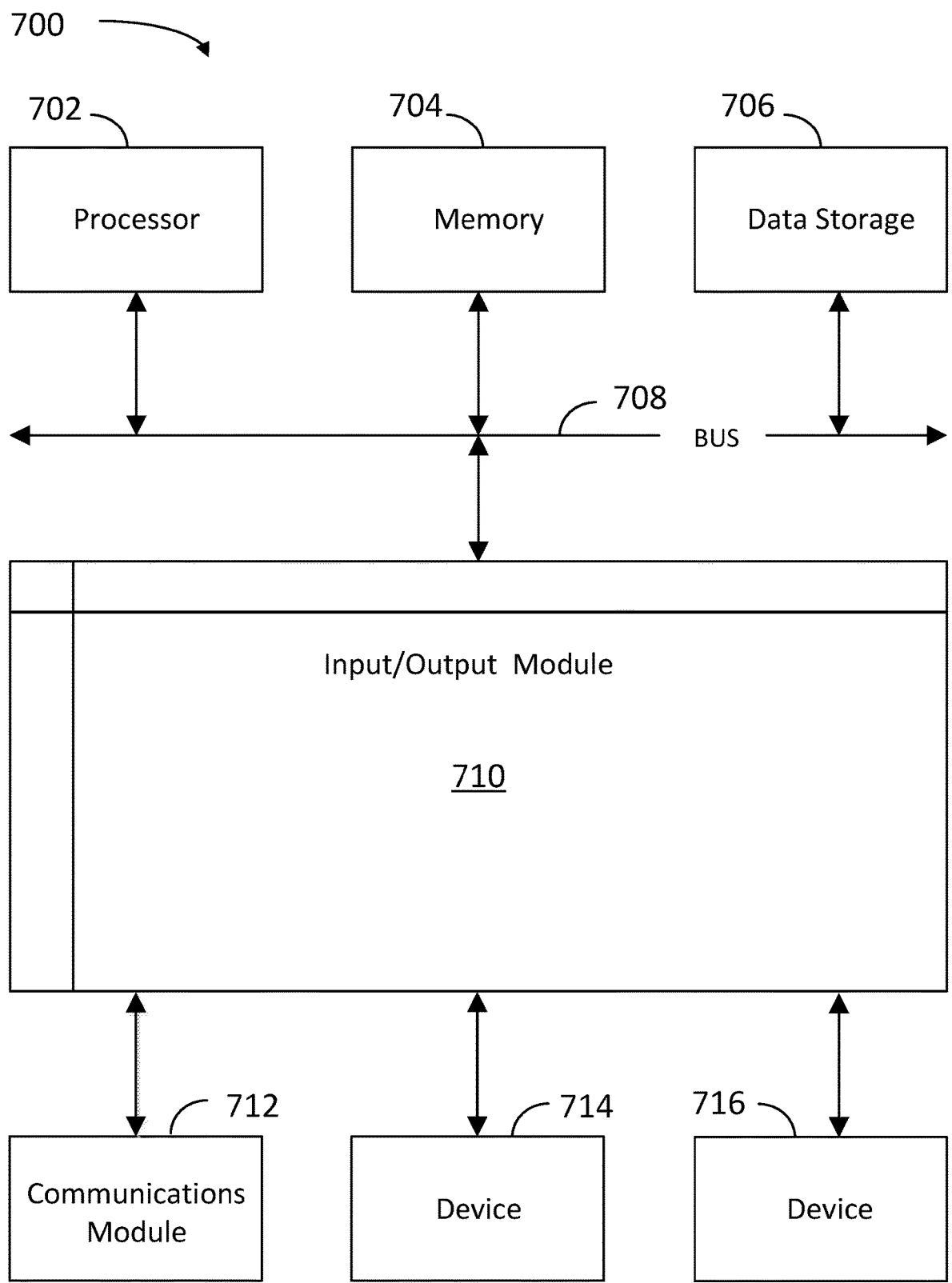
FIG. 7 is a block diagram illustrating an example computer system with which the client and server of FIGS. 1 and 2, and the methods of FIGS. 4 and 5 can be implemented, according to some embodiments.

FIG. 7 is a block diagram illustrating an exemplary computer system 700 with which the client 110 and server 130 of FIGS. 1 and 2, and the methods of FIGS. 6 and 7 can be implemented. In certain aspects, the computer system 800 may be implemented using hardware or a combination of software and hardware, either in a dedicated server, or integrated into another entity, or distributed across multiple entities.

Computer system 700 (e.g., client 110 and server 130) includes a bus 708 or other communication mechanism for communicating information, and a processor 702 (e.g., processors 212 and 236) coupled with bus 708 for processing information. By way of example, the computer system 700 may be implemented with one or more processors 702. Processor 702 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 700 can include, in addition to hardware, a code that creates an execution environment for the computer program in question, e.g., code that constitutes processor firmware, a protocol stack, a database management system, an operating system, or a combination of one or more of them stored in an included memory 704 (e.g., memories 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 708 for storing information and instructions to be executed by processor 702. The processor 702 and the memory 704 can be supplemented by, or incorporated in, a special purpose logic circuitry.

The instructions may be stored in the memory 704 and implemented in one or more computer program products, i.e., one or more modules of computer program instructions encoded on a computer readable medium for execution by, or to control the operation of, the computer system 700, and according to any method well known to those skilled in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 704 may also be used for storing temporary variable or other intermediate information during execution of instructions to be executed by processor 702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 700 further includes a data storage device 706 such as a magnetic disk or optical disk, coupled to bus 708 for storing information and instructions. Computer system 700 may be coupled via input/output module 710 to various devices. Input/output module 710 can be any input/output module. Exemplary input/output modules 710 include data ports such as USB ports. The input/output module 710 is configured to connect to a communications module 712. Exemplary communications modules 712 (e.g., communications modules 218 and 238) include networking interface cards, such as Ethernet cards and modems. In certain aspects, input/output module 710 is configured to connect to a plurality of devices, such as an input device 714 (e.g., input device 214) and/or an output device 716 (e.g., output device 216). Exemplary input devices 714 include a keyboard and a pointing device, e.g., a mouse or a trackball, by which a user can provide input to the computer system 700. Other kinds of input devices 714 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 716 include display devices, such as an LCD (liquid crystal display) monitor, for displaying information to the user.

According to one aspect of the present disclosure, the client 110 and server 130 can be implemented using a computer system 700 in response to processor 702 executing one or more sequences of one or more instructions contained in memory 704. Such instructions may be read into memory 704 from another machine-readable medium, such as data storage device 706. Execution of the sequences of instructions contained in main memory 704 causes processor 702 to perform the process steps described herein. One or more processors in a multi-processing arrangement may also be employed to execute the sequences of instructions contained in memory 704. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 700 can include clients and servers. A client and server are generally remote from each other and typically interact through a communication network. The relationship of client and server arises by virtue of computer programs running on the respective computers and having a client-server relationship with each other. Computer system 700 can be, for example, and without limitation, a desktop computer, laptop computer, or tablet computer. Computer system 700 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 802 for execution. Such a medium may take many forms, including, but not limited to, non-volatile media, volatile media, and transmission media. Non-volatile media include, for example, optical or magnetic disks, such as data storage device 706. Volatile media include dynamic memory, such as memory 704. Transmission media include coaxial cables, copper wire, and fiber optics, including the wires that comprise bus 708. Common forms of machine-readable media include, for example, floppy disk, flexible disk, hard disk, magnetic tape, any other magnetic medium, CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of preceding a series of items, with the terms "and" or "or" to separate any of the items, modifies the list as a whole, rather than each member of the list (i.e., each item). The phrase "at least one of does not require selection of at least one item; rather, the phrase allows a meaning that includes at least one of any one of the items, and/or at least one of any combination of the items, and/or at least one of each of the items. By way of example, the phrases "at least one of X, Y, and Z" or "at least one of X, Y, or Z" each refer to only X, only Y, or only Z; any combination of X, Y, and Z; and/or at least one of each of X, Y, and Z.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
    receiving a document, the document comprising multiple data units arranged in a sequence;
    separating a fragment from the sequence by identifying a first token delimiter, wherein the first token delimiter comprises one of a start portion or an end portion of the fragment;
    separating a first data unit from the fragment by identifying a second token delimiter;
        wherein the first and second token delimiters are identified according to a document type of the document and the first and second token delimiters are customized for document types including a video file, an image file, a text-rich document, and at least a portion of a genome;

determining a fragment rank based on a frequency score of the first data unit within the fragment, wherein the fragment rank is obtained by a ratio of a number of data units having a low frequency score to a number of data units having a high frequency score;

placing the fragment in a sorted list based on the fragment rank, the sorted list comprising multiple fragments of the document;

forming a modified document including at least a top fragment from the sorted list, the top fragment having a top fragment rank greater than a user selected rank; and providing the modified document to the user.

2. The computer-implemented method of claim 1, wherein the document comprises a text-rich document, the sequence comprises a text, the fragment comprises a sentence, and the first data unit comprises a word, and wherein separating a fragment from the sequence comprises identifying a period in the text, and separating the first data unit from the fragment comprises identifying a space in the text.

3. The computer-implemented method of claim 1, wherein separating a fragment from the sequence comprises finding a contour in a picture, and selecting the fragment from an outline formed by the contour when the document comprises an image.

4. The computer-implemented method of claim 1, wherein separating a fragment from the sequence comprises identifying an amplitude differential greater than a preselected threshold in at least one frequency component in the document over a period of time, and selecting the fragment to comprise at least a data unit within the period of time, when the document comprises an audio document.

5. The computer-implemented method of claim 1, wherein the document is a text-rich document, the fragment comprises a sentence, and the first data unit comprises a word, and further comprising:

identifying a stem for the word, and correcting a spelling mistake in the word prior to determining a frequency of the first data unit within the fragment.

6. The computer-implemented method of claim 1, further comprising determining the frequency score of the first data unit based on a frequency of the first data unit and a frequency of a second data unit within the fragment.

7. The computer-implemented method of claim 1, wherein the document comprises a text-rich document, the sequence comprises a text, the fragment comprises a sentence, and the first data unit comprises a word, and wherein determining the frequency score of the first data unit comprises identifying a scarcity score of the word within the text-rich document, and identifying a location in the text where a new information is introduced based on a change in the scarcity score at the location in the text.

8. The computer-implemented method of claim 1, wherein the document comprises a text-rich document, the fragment is a sentence comprising multiple words, and the first data unit is a word selected from the multiple words, and wherein determining a fragment rank comprises determining a scarcity score for each of the multiple words in the sentence.

9. The computer-implemented method of claim 1, wherein determining a fragment rank comprises determining a ratio of a number of data units having a low frequency score to a number of data units having a high frequency score.

10. The computer-implemented method of claim 1, wherein placing the fragment in a sorted list comprises associating the fragment with a pointer identifying a location of the fragment in the sequence and with a length identifying a number of data units in the fragment.

11. The computer-implemented method of claim 1, wherein forming the modified document comprises receiving, from the user, a number of fragments to select from the sorted list.

12. The computer-implemented method of claim 1, wherein providing the modified document to the user comprises at least one of highlighting the top fragment, bolding a text font in the top fragment, and providing a visual identifier to differentiate the top fragment from a fragment having a lower fragment rank than the top fragment.

13. A system comprising:

one or more processors; and a memory coupled to the one or more processors, the memory including instructions that, when executed by the one or more processors, cause the one or more processors to:

receive a document, the document comprising a plurality of data units arranged in a sequence;

separate the sequence into a plurality of fragments by identifying a first token delimiter, wherein the first token delimiter comprises one of a start portion or an end portion of each fragment;

separate each fragment into at least one data unit by identifying a second token delimiter and applying the first and second token delimiters in an interleaved sequence;

determine a frequency score of the first data unit by identifying a scarcity score of the first data unit within the document;

identify a location in the text where new information is introduced based on a change in the scarcity score at the location in the document;

determine a fragment rank based on the frequency score for the at least one data unit within each fragment;

arrange the plurality of fragments in a sorted list based on the fragment rank, the sorted list comprising each of the plurality of fragments of the document;

form a modified document including at least a top fragment from the sorted list, the top fragment having a top fragment rank greater than a user selected rank and identifying the location of the new information; and provide the modified document to the user.

14. The system of claim 13, wherein the one or more processors comprises an aggregator configured to receive a document comprising one of a video file, an image file, a text-rich document, or at least a portion of a genome.

15. The system of claim 13, wherein the document comprises a text-rich document, the sequence comprises a text, the fragment comprises a sentence, and the first data unit comprises a word, and the one or more processors comprises a primary delimiter configured to identify a period in the text, and a sub-delimiter configured to separate the first data unit from the fragment comprises identifying a space.

16. The system of claim 13, wherein to separate a fragment from the sequence, the one or more processors execute instructions to cause the system to find a contour in a picture, and to select the fragment from an outline formed by the contour when the document comprises an image.

17. The system of claim 13, wherein to separate a fragment from the sequence, the one or more processors execute instructions to cause the system to identify an amplitude differential greater than a pre-selected threshold in at least one frequency component in the document over a period of time, and to select the fragment to comprise at least a data unit within the period of time, when the document comprises an audio document.

18. A non-transitory, computer readable medium comprising instructions which, when executed by a processor in a computer, cause the computer to execute a method, the method comprising:
- receiving a document, the document comprising a plurality of data units arranged in a sequence;
- separating the sequence into a plurality of fragments by identifying a token delimiter, wherein the token delimiter comprises one of a start portion or an end portion of the fragment;
- separating each fragment into a plurality of first data units by identifying a second token delimiter;
- separating each fragment into a plurality of second data units by identifying a third token delimiter;
- determining an average fragment having an average fragment size and an average data unit content;
- determining a first frequency score based on a frequency of the first data unit and a second frequency score based on a frequency of a second data unit within the fragment wherein the frequency scores are based on a comparison to the average fragment;
- determining a fragment rank based on the first and second frequency scores within each of the plurality of fragments;
- placing the plurality of fragments in a sorted list based on the fragment rank;
- generating a checksum of the data units of each fragment and adjusting the fragment rank based on the checksum;
- forming a modified document including at least a top fragment from the sorted list, the top fragment having a top fragment rank greater than a user selected rank; and
- providing the modified document to the user.

19. The non-transitory, computer-readable medium of claim 18, wherein the method further comprises receiving one of a video file, an image file, a text-rich document, or at least a portion of a genome, when receiving the document.

* * * * *